(12) United States Patent
Kim (10) Patent No.: US 11,871,128 B2
(45) Date of Patent: *Jan. 9, 2024

(54) IMAGE SENSING DEVICE HAVING A MIRRORING CIRCUIT SUITABLE FOR COMPENSATING AN OPERATING CURRENT

(71) Applicant: SK hynix Inc., Gyeonggi-do (KR)

(72) Inventor: Hyeon June Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,083

(22) Filed: Nov. 29, 2022

(65) Prior Publication Data

US 2023/0096575 A1 Mar. 30, 2023

Related U.S. Application Data

(62) Division of application No. 17/068,323, filed on Oct. 12, 2020, now Pat. No. 11,539,901.

(30) Foreign Application Priority Data

Apr. 16, 2020 (KR) ........................ 10-2020-0045972

(51) Int. Cl.
*H04N 25/60* (2023.01)
*G05F 3/26* (2006.01)
*H04N 25/77* (2023.01)
*H04N 25/709* (2023.01)

(52) U.S. Cl.
CPC ............. *H04N 25/60* (2023.01); *G05F 3/262* (2013.01); *H04N 25/709* (2023.01); *H04N 25/77* (2023.01)

(58) Field of Classification Search
CPC ...... H04N 25/60; H04N 25/709; H04N 25/77; H04N 25/75; H04N 25/772; H04N 23/81; H04N 25/76; G05F 3/262
See application file for complete search history.

(56) References Cited

U.S. PATENT DOCUMENTS

| | | | |
|---|---|---|---|
| 9,232,165 B2 * | 1/2016 | Saito | H03M 1/08 |
| 11,539,901 B2 * | 12/2022 | Kim | H04N 25/75 |
| 2014/0160331 A1 * | 6/2014 | Murakami | H04N 25/677 348/300 |
| 2016/0249005 A1 * | 8/2016 | Matsumoto | H04N 25/677 |
| 2016/0277696 A1 * | 9/2016 | Jung | H01L 27/14643 |
| 2018/0176490 A1 * | 6/2018 | Nakamizo | H01L 27/1464 |
| 2021/0185256 A1 * | 6/2021 | Yamashita | H03M 1/56 |

* cited by examiner

*Primary Examiner* — Luong T Nguyen
(74) *Attorney, Agent, or Firm* — IP & T GROUP LLP (57) ABSTRACT

Disclosed is an image sensing device including a current supply circuit coupled between a supply terminal of a first voltage and a pair of output terminals, an input circuit coupled between the pair of output terminals and a common node, and suitable for receiving a pixel signal and a ramp signal, and a mirroring circuit coupled between the common node and a supply terminal of a second voltage, and suitable for compensating for an operating current, which flows between the common node and the supply terminal of the second voltage, based on a reference current when generating the operating current by mirroring the reference current.

10 Claims, 8 Drawing Sheets

IMAGE SENSING DEVICE HAVING A MIRRORING CIRCUIT SUITABLE FOR COMPENSATING AN OPERATING CURRENT

CROSS-REFERENCE TO RELATED APPLICATION(S)

This application is a division of U.S. patent application Ser. No. 17/068,323 filed on Oct. 12, 2020, which claims priority under 35 U.S.C. § 119 to Korean Patent Application No, 10-2020-0045972, filed on Apr. 16, 2020, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices are devices for capturing images using the property of a semiconductor which reacts to light. Image sensing devices may be classified into charge-coupled device (CCD) image sensing devices and complementary metal-oxide semiconductor (CMOS) image sensing devices, Recently, CMOS image sensing devices are more widely used because the CMOS image sensing devices can allow both analog and digital control circuits to be directly implemented on a single integrated circuit (IC).

SUMMARY

Various embodiments of the present disclosure are directed to an image sensing device capable of suppressing banding noise occurring in a circuit structure.

In accordance with an embodiment, an image sensing device may include: a current supply circuit coupled between a supply terminal of a first voltage and a pair of output terminals; an input circuit coupled between the pair of output terminals and a common node, and suitable for receiving a pixel signal and a ramp signal; and a mirroring circuit coupled between the common node and a supply terminal of a second voltage, and suitable for compensating for an operating current, which flows between the common node and the supply terminal of the second voltage, based on a reference current when generating the operating current by mirroring the reference current.

The mirroring circuit may include: a first mirroring element coupled between an input terminal of the reference current and the supply terminal of the second voltage, and suitable for generating a bias voltage corresponding to the reference current; a second mirroring element coupled between the common node and the supply terminal of the second voltage, and suitable for generating the operating current corresponding to the reference current based on the bias voltage; a compensation element coupled between a supply terminal of a third voltage and an output terminal of the bias voltage, and suitable for compensating for the bias voltage based on the reference current; and a current source coupled between the output terminal of the bias voltage and the supply terminal of the second voltage.

The first mirroring element and the compensation element may be coupled to each other in a nested feedback structure.

In accordance with an embodiment, an image sensing device may include: a current supply circuit coupled between a supply terminal of a first voltage and a pair of output terminals; an input circuit coupled between the pair of output terminals and a common node, and suitable for receiving a pixel signal and a ramp signal; and a mirroring circuit coupled between the common node and a supply terminal of a second voltage, and suitable for compensating for an operating current, which flows between the common node and the supply terminal of the second voltage, based on the operating current when generating the operating current by mirroring the reference current.

The mirroring circuit may include: a first mirroring element coupled between an input terminal of the reference current and the supply terminal of the second voltage, and suitable for generating a bias voltage corresponding to the reference current; a second mirroring element coupled between the common node and the supply terminal of the second voltage, and suitable for generating the operating current corresponding to the reference current based on the bias voltage; a compensation element coupled between the supply terminal of the first voltage and an output terminal of the bias voltage, and suitable for compensating for the bias voltage based on the operating current; and a current source coupled between the output terminal of the bias voltage and the supply terminal of the second voltage.

The first mirroring element and the compensation element may be coupled to each other in a nested feedback structure.

In accordance with an embodiment, an image sensing device may include: a reference current generator suitable for generating a reference current; at least one bias voltage generator suitable for generating at least one bias voltage corresponding to the reference current, and compensating for the at least one bias voltage based on the reference current; and a plurality of comparators enabled based on the at least one bias voltage, and suitable for comparing a plurality of pixel signals with a ramp signal, respectively.

The at least one bias voltage generator may include: a first mirroring element coupled between an input terminal of the reference current and a supply terminal of a low voltage, and suitable for generating a bias voltage corresponding to the reference current; a compensation element coupled between a supply terminal of a first high voltage and an output terminal of the bias voltage, and suitable for compensating for the bias voltage based on the reference current; and a current source coupled between the output terminal of the bias voltage and the supply terminal of the low voltage.

The first mirroring element and the compensation element may be coupled to each other in a nested feedback structure.

In accordance with an embodiment, an image sensing device may include: a reference current generator suitable for generating a reference current; at least one bias voltage generator suitable for generating at least one bias voltage corresponding to the reference current; and a plurality of comparators enabled based on the at least one bias voltage, and suitable for compensating for the bias voltage based on an operating current generated therein when comparing a plurality of pixel signals with a ramp signal, respectively.

Each of the comparators may include: a current supply circuit coupled between a supply terminal of a second high voltage and a pair of output terminals; an input circuit coupled between the pair of output terminals and a common node, and suitable for receiving each of the pixel signals and the ramp signal; a second mirroring dement coupled between the common node and a supply terminal of a low voltage, and suitable for generating the operating current corresponding to the reference current based on a corresponding bias voltage; a compensation dement coupled between the supply terminal of the second high voltage and an output terminal of the corresponding bias voltage, and suitable for compensating for the bias voltage based on the operating current; and a current source coupled between the output terminal of the corresponding bias voltage and the supply terminal of the low voltage.

The second mirroring element and the compensation element may be coupled to each other in a nested feedback structure.

The at least one bias voltage generator may include a first mirroring element coupled between an input terminal of the reference current and a supply terminal of a low voltage and generate the bias voltage corresponding to the reference current.

In accordance with an embodiment, an image sensing device may include: a generating circuit suitable for generating a bias voltage according to a reference current; a comparing circuit suitable for generating an operating current according to the bias voltage and comparing, based on the operating current, a pixel signal with a ramp signal to generate a comparison signal; and a compensating circuit suitable for compensating for the bias voltage according to one of the reference current and the operating current.

DETAILED DESCRIPTION

Various embodiments are described below with reference to the accompanying drawings, in order to describe in detail the present disclosure so those with ordinary skill in art to which the present disclosure pertains, may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification, specify the presence of the stated elements and do not preclude the presence or addition of one or more other elements. In the description throughout the specification, some components are described in singular forms, but the present disclosure is not limited thereto, and it will be understood that the components may be formed in plural, FIG. 1 is a block diagram illustrating an image sensing device 100 in accordance with a first embodiment of the present disclosure.

Figure 1:
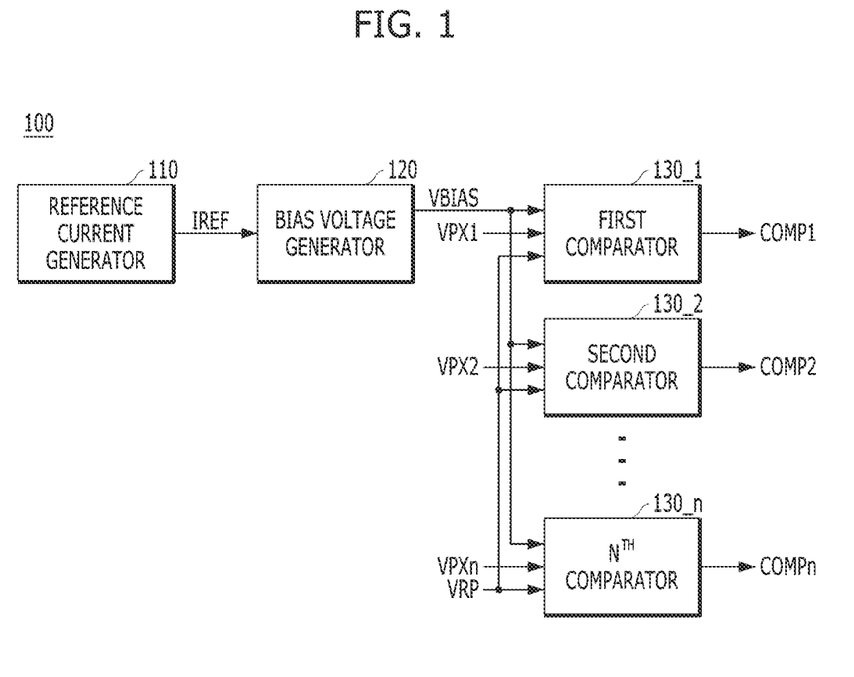
FIG. 1 is a block diagram illustrating an image sensing device in accordance with a first embodiment of the present disclosure.

Referring to FIG. 1, the image sensing device 100 may include a reference current generator 110, a bias voltage generator 120 and first to $n^{th}$ comparators 130_1 to 130_$n$.

The reference current generator 110 may generate a reference current XREF. For example, the reference current generator 110 may include a band-gap reference circuit. In an embodiment, the reference current generator 110 may be coupled between a supply terminal of a first high voltage VDD1 and a supply terminal of a low voltage VSS.

The bias voltage generator 120 may generate a bias voltage VBIAS corresponding to the reference current IREF. The bias voltage generator 120 may compensate for the bias voltage VBIAS based on the reference current IREF. In an embodiment, the bias voltage generator 120 may be coupled between the supply terminal of the first high voltage VDD1 and the supply terminal of the low voltage VSS (refer to FIG. 2).

Each of the first to $n^{th}$ comparators 130_1 to 130_$n$ may be enabled based on the bias voltage VBIAS. The first to $n^{th}$ comparators 1301 to 130_$n$ may compare first to $n^{th}$ pixel signals VPX1 to VPXn with a ramp signal VRP, respectively, and generate first to $n^{th}$ comparison signals COMP1 to COMPn corresponding to the comparison results, respectively. For example, the first comparator 130_1 may be enabled based on the bias voltage VBIAS, compare the first pixel signal VPX1 with the ramp signal VRP, and generate the first comparison signal COMP1 corresponding to the comparison result. In an embodiment, each of the first to $n^{th}$ comparators 130_1 to 130_$n$ may be coupled between a supply terminal of a second high voltage VDD2 and the supply terminal of the low voltage VSS (refer to FIG. 2). The first high voltage VDD1 and the second high voltage VDD2 may be different voltages or the same voltage.

Figure 2:
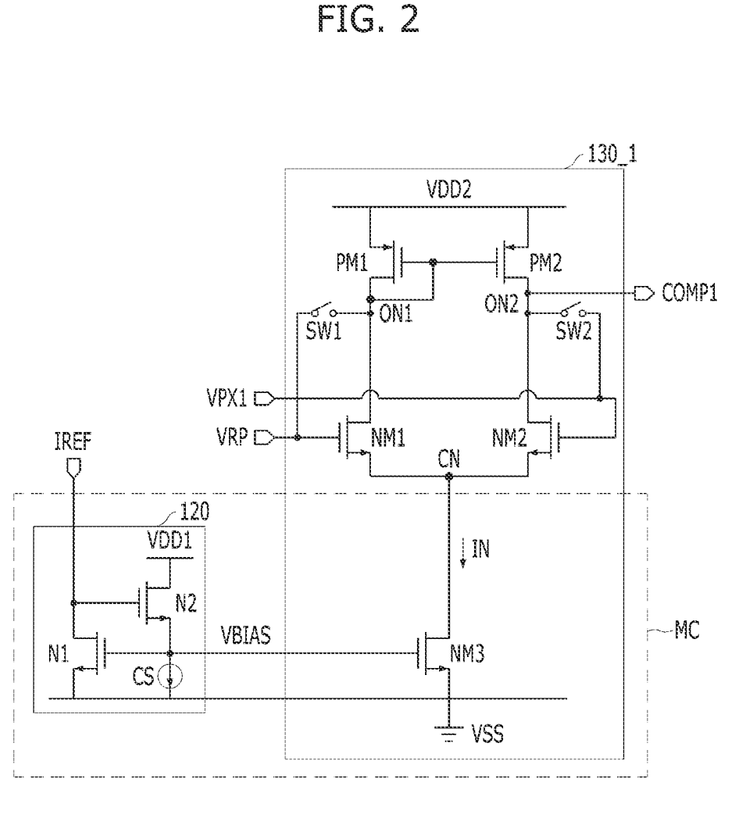
FIG. 2 is a circuit diagram illustrating a bias voltage generator and a first comparator illustrated in FIG. 1.

FIG. 2 is a circuit diagram illustrating the bias voltage generator 120 and the first comparator 1301, such as that illustrated in FIG. 1.

Referring to FIG. 2, the bias voltage generator 120 may include a first mirroring element N1, a compensation element N2 and a current source CS.

The first mirroring element N1 may be coupled between an input terminal of the reference current IREF and the supply terminal of the low voltage VSS, and generate the bias voltage VBIAS corresponding to the reference current IREF. For example, the first mirroring element N1 may include an NMOS transistor having a gate terminal coupled to an output terminal of the bias voltage VBIAS and a drain terminal and a source terminal coupled between the input terminal of the reference current IREF and the supply terminal of the low voltage VSS.

The compensation element N2 may be coupled between the supply terminal of the first high voltage VDD1 and the output terminal of the bias voltage VBIAS, and compensate for the bias voltage VBIAS based on the reference current IREF. For example, the compensation element N2 may include an NMOS transistor having a gate terminal coupled to the input terminal of the reference current IREF and a source terminal and a drain terminal coupled between the supply terminal of the first high voltage VDD1 and the output terminal of the bias voltage VBIAS.

The first mirroring element N1 and the compensation element N2 may be coupled to each other in a nested feedback structure.

The current source CS may be coupled between the output terminal of the bias voltage VBIAS and the supply terminal of the low voltage VSS. The current source CS may serve to help the compensation element N2 to apply a compensation current to the output terminal of the bias voltage VBIAS.

The first comparator 130_1 may include current supply circuits PM1 and PM2, input circuits NM1 and NM2, an enable circuit NM3 and switch circuits SW1 and SW2.

The current supply circuits PM1 and PM2 may be coupled between the supply terminal of the second high voltage VDD2 and a pair of output terminals ON1 and ON2. The first comparison signal COMP1 may be generated through one of the pair of output terminals ON1 and ON2.

The input circuits NM1 and NM2 may be coupled between the pair of output terminals ON1 and ON2 and a common node CN, The input circuits NM1 and NM2 may receive the first pixel signal VPX1 and the ramp signal VRP.

The enable circuit NM3 may be coupled between the common node CN and the supply terminal of the low voltage VSS. The enable circuit NM3 may generate an operating current IN corresponding to the reference current IREF based on the bias voltage VBIAS. For example, the enable circuit NM3 may include an NMOS transistor having a gate terminal coupled to the output terminal of the bias voltage VBIAS and a drain terminal and a source terminal coupled between the common node CN and the supply terminal of the low voltage VSS.

The enable circuit NM3 may be configured as a mirroring circuit MC together with the bias voltage generator 120. That is, the enable circuit NM3 may be configured as a second mirroring element NM3 interconnected with the first mirroring element N1. The mirroring circuit MC may be coupled between the common node CN and the supply terminal of the low voltage VSS, and generate the operating current IN, which flows between the common node CN and the supply terminal of the low voltage VSS, by mirroring the reference current IREF. The mirroring circuit MC may compensate for the operating current IN based on the reference current IREF.

Hereinafter, an operation of the image sensing device 100 in accordance with the first embodiment, which has the above-described configuration, will be described.

When the reference current generator 110 generates the reference current IREF, the bias voltage generator 120 may generate the bias voltage VBIAS corresponding to the reference current IREF, and the first to $n^{th}$ comparators 130_1 to 130_n may be enabled according to the bias voltage VBIAS.

When the first to $n^{th}$ pixel signals VPX1 to VPXn and the ramp signal VRP are input, the first to $n^{th}$ comparators 130_1 to 130_n may compare the first to $n^{th}$ pixel signals VPX1 to VPXn with the ramp signal VRP, respectively, and generate the first to $n^{th}$ comparison signals COMP1 to COMPn corresponding to the comparison results, respectively.

In an embodiment, the first to $n^{th}$ comparators 130_1 to 130_n may operate simultaneously. That is, the first to ntn comparison signals COMP1 to COMPn may transition simultaneously or transition at different timings according to levels of the first to $n^{th}$ pixel signals VPX1 to VPXn, respectively. As the number of comparison signals that transition simultaneously among the first to $n^{th}$ comparison signals COMP1 to COMPn is increased, noise may be reflected in the operating current IN flowing through each of the first to $n^{th}$ comparators 130_1 to 130_n. In other words, the noise having a positive (+) voltage level or a negative (−) voltage level may be applied to the output terminal of the bias voltage VBIAS. The noise is referred to as banding noise. The reference current IREF may not have a target level due to the banding noise. Since the bias voltage VBIAS also does not have the target level due to the reference current IREF not having the target level, the first to $n^{th}$ comparators 130_1 to 130_n may not normally generate the first to $n^{th}$ comparison signals COMP1 to COMPn.

However, the compensation element N2 included in the bias voltage generator 120 may sense when the reference current IREF does not have the target level, and compensate for the bias voltage VBIAS.

For example, the compensation element N2 may adjust the compensation current applied to the output terminal of the bias voltage VBIAS when the reference current IREF is changed. When the reference current IREF becomes higher than the target level due to the banding noise having the positive (+) voltage level, the compensation element N2 may apply a relatively low compensation current to the output terminal of the bias voltage VBIAS. On the other hand, when the reference current IREF becomes lower than the target level due to the banding noise having the negative (−) voltage level, the compensation element N2 may apply a relatively high compensation current to the output terminal of the bias voltage VBIAS. Accordingly, the first to $n^{th}$ comparators 130_1 to 130_n may normally generate the first to $n^{th}$ comparison signals COMP1 to COMPn, respectively, while the noise reflected in the operating current IN is offset.

Figure 3:
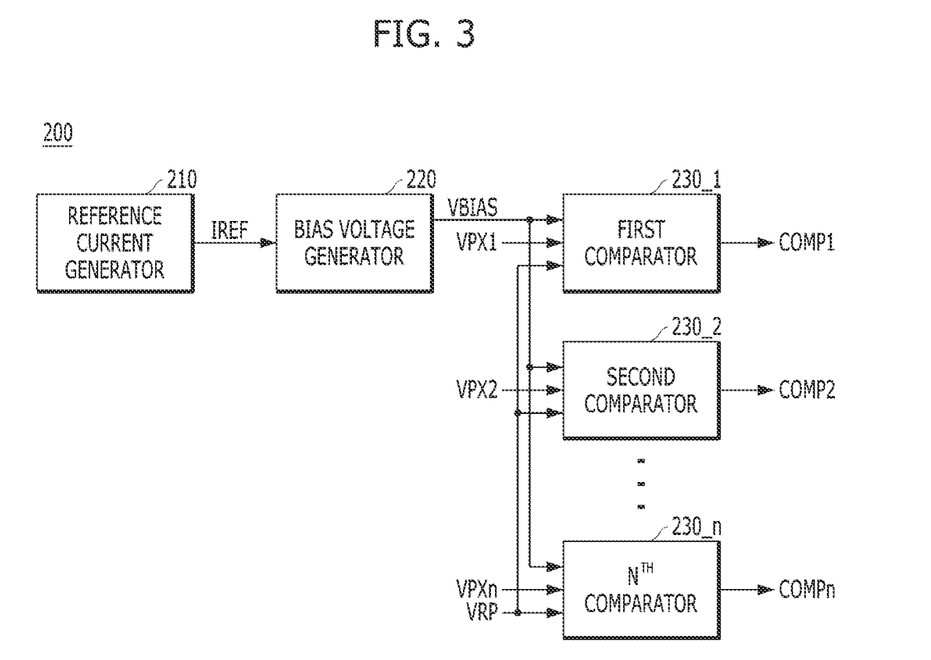
FIG. 3 is a block diagram illustrating an image sensing device in accordance with a second embodiment of the present disclosure.

FIG. 3 is a block diagram illustrating an image sensing device 200 in accordance with a second embodiment of the present disclosure.

Referring to FIG. 3, the image sensing device 200 may include a reference current generator 210, a bias voltage generator 220 and first to $n^{th}$ comparators 230_1 to 230_n.

The reference current generator 210 may generate a reference current IREF. For example, the reference current generator 210 may include a band-gap reference circuit.

The bias voltage generator 220 may generate a bias voltage VBIAS corresponding to the reference current IREF. Each of the first to $n^{th}$ comparators 230_1 to 230_n may be enabled based on the bias voltage VBIAS. The first to $n^{th}$ comparators 230_1 to 230_n may compare first to $n^{th}$ pixel signals VPX1 to VPXn with a ramp signal VRP, respectively, and generate first to $n^{th}$ comparison signals COMP1 to COMPn corresponding to the comparison results, respectively. For example, the first comparator 230_1 may be enabled based on the bias voltage VBIAS, compare the first pixel signal VPX1 with the ramp signal VRP, and generate the first comparison signal COMP1 corresponding to the comparison result. When comparing each of the first to $n^{th}$ pixel signals VPX1 to VPXn with the ranip signal VRP, the first to $n^{th}$ comparators 230_1 to 230_n may compensate for the bias voltage VBIAS based on an operating current IN generated therein, FIG. 4 is a circuit diagram illustrating the bias voltage generator 220 and the first comparator 230_1, such as that illustrated in FIG. 3.

Figure 4:
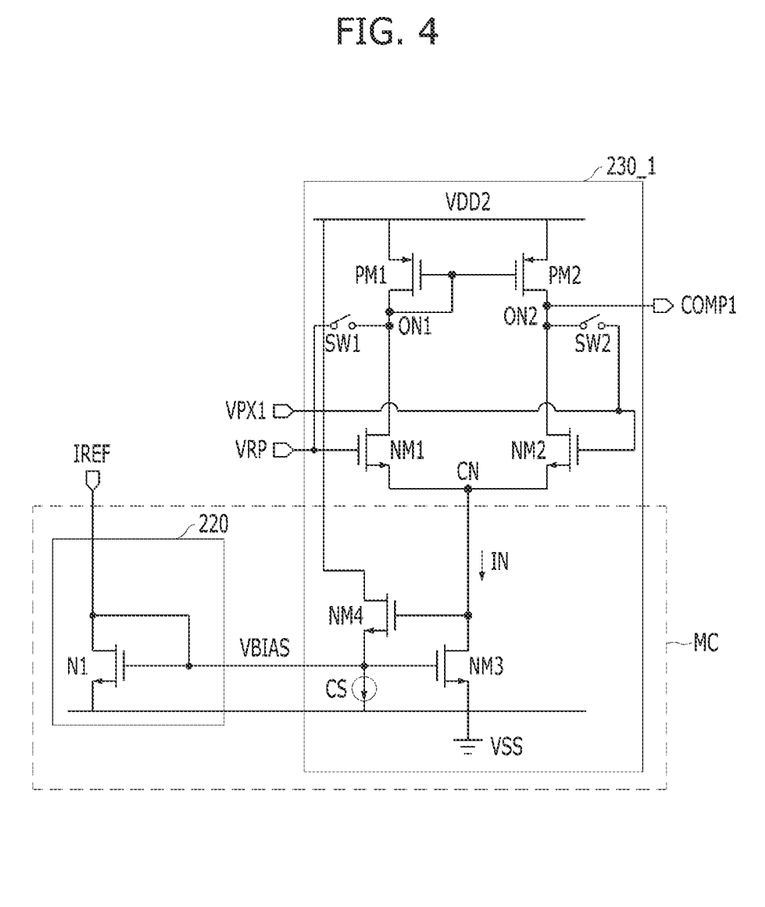
FIG. 4 is a circuit diagram illustrating a bias voltage generator and a first comparator illustrated in FIG. 3.

Referring to FIG. 4, the bias voltage generator 220 may include a first mirroring element N1.

The first mirroring element N1 may be coupled between an input terminal of the reference current IREF and a supply terminal of a low voltage VSS, and generate the bias voltage VBIAS corresponding to the reference current IREF. For example, the first mirroring element N may include an NMOS transistor having a gate terminal and a drain terminal coupled to an output terminal of the bias voltage VBIAS and a source terminal coupled to the supply terminal of the low voltage VSS.

The first comparator 230_1 may include current supply circuits PM1 and PM2, input circuits NM1 and NM2, an enable circuit NM3, a compensation element NM4, a current source CS and switch circuits SW1 and SW2.

The current supply circuits PM1 and PM2 may be coupled between a supply terminal of a second high voltage VDD2 and a pair of output terminals ON1 and ON2. The first comparison signal COMP1 may be generated through one of the pair of output terminals ON1 and ON2.

The input circuits NM3 and NM2 may be coupled between the pair of output terminals ON1 and ON2 and a common node CN. The input circuits NM1 and NM2 may receive the first pixel signal VPX1 and the ranip signal VRP.

The enable circuit NM3 may be coupled between the common node CN and the supply terminal of the low voltage VSS. The enable circuit NM3 may generate the operating current IN corresponding to the reference current IREF based on the bias voltage VBIAS. For example, the enable circuit NM3 may include an NMOS transistor having a gate terminal coupled to the output terminal of the bias voltage VBIAS and a drain terminal and a source terminal coupled between the common node CN and the supply terminal of the low voltage VSS.

The compensation element NM4 may be coupled between the supply terminal of the second high voltage VDD2 and the output terminal of the bias voltage VBIAS, and compensate for the bias voltage VBIAS based on the operating current IN. For example, the compensation element NM4 may include an NMOS transistor having a gate terminal coupled to the common node CN and a source terminal and a drain terminal coupled between the supply terminal of the second high voltage VDD2 and the output terminal of the bias voltage VBIAS.

The enable circuit NM3 and the compensation element NM4 may be coupled to each other in a nested feedback structure.

The current source CS may be coupled between the output terminal of the bias voltage VBIAS and the supply terminal of the low voltage VSS. The current source CS may serve to help the compensation element NM4 apply a compensation current to the output terminal of the bias voltage VBIAS.

The enable circuit NM3 may be configured as a mirroring circuit MC together with the bias voltage generator 220. That is, the enable circuit NM3 may be configured as a second mirroring element NM3 interconnected with the first mirroring element N1. The mirroring circuit MC may be coupled between the common node CN and the supply terminal of the low voltage VSS, and generate the operating current IN, which flows between the common node CN and the supply terminal of the low voltage VSS, by mirroring the reference current IREF, In an embodiment, the mirroring circuit MC may compensate for the operating current IN based on the operating current IN.

Hereinafter, an operation of the image sensing device 200 in accordance with the second embodiment, which has the above-described configuration, will be described.

When the reference current generator 210 generates the reference current IREF, the bias voltage generator 220 may generate the bias voltage VBIAS corresponding to the reference current IREF, and the first to $n^{th}$ comparators 230_1 to 230_$n$ may be enabled according to the bias voltage VBIAS.

When the first to $n^{th}$ pixel signals VPX1 to VPXn and the ramp signal VRP are input, the first to $n^{th}$ comparators 230_1 to 230_$n$ may compare the first to $n^{th}$ pixel signals VPX1 to VPXn with the ramp signal VRP, respectively, and generate the first to $n^{th}$ comparison signals COMP1 to COMPn corresponding to the comparison results, respectively.

In an embodiment, the first to $n^{th}$ comparators 230_1 to 230_$n$ may operate simultaneously. That is, the first to $n^{th}$ comparison signals COMP1 to COMPn may transition simultaneously or transition at different timings according to levels of the first to $n^{th}$ pixel signals VPX1 to VPXn, respectively. As the number of comparison signals that transition simultaneously among the first to $n^{th}$ comparison signals COMP1 to COMPn is increased, noise may be reflected in the operating current IN flowing through each of the first to $n^{th}$ comparators 230_1 to 230_$n$. In other words, the noise having a positive (+) voltage level or a negative (−) voltage level may be applied to the output terminal of the bias voltage VBIAS, The noise is referred to as banding noise. The reference current IREF may not have a target level due to the banding noise. Since the bias voltage VBIAS also does not have the target level due to the reference current IREF not having the target level, the first to $n^{th}$ comparators 230_1 to 230_$n$ may not normally generate the first to $n^{th}$ comparison signals COMP1 to COMPn.

However, the compensation element NM4 included in each of the first to $n^{th}$ comparators 2301 to 230_$n$ may sense when the operating current IN does not have the target level, and compensate for the bias voltage VBIAS. For example, the compensation element NM4 may adjust the compensation current applied to the output terminal of the bias voltage VBIAS when the reference current IREF is changed. When the reference current IREF becomes higher than the target level due to the banding noise having the positive (+) voltage level, the compensation element NM4 may apply a relatively low compensation current to the output terminal of the bias voltage VBIAS. On the other hand, when the reference current IREF becomes lower than the target level due to the banding noise having the negative (−) voltage level, the compensation element NM4 may apply a relatively high compensation current to the output terminal of the bias voltage VBIAS. Accordingly, the first to n' comparators 230_1 to 230_$n$ may normally generate the first to $n^{th}$ comparison signals COMP1 to COMPn, respectively, while the banding noise reflected in the operating current IN is offset.

Figure 5:
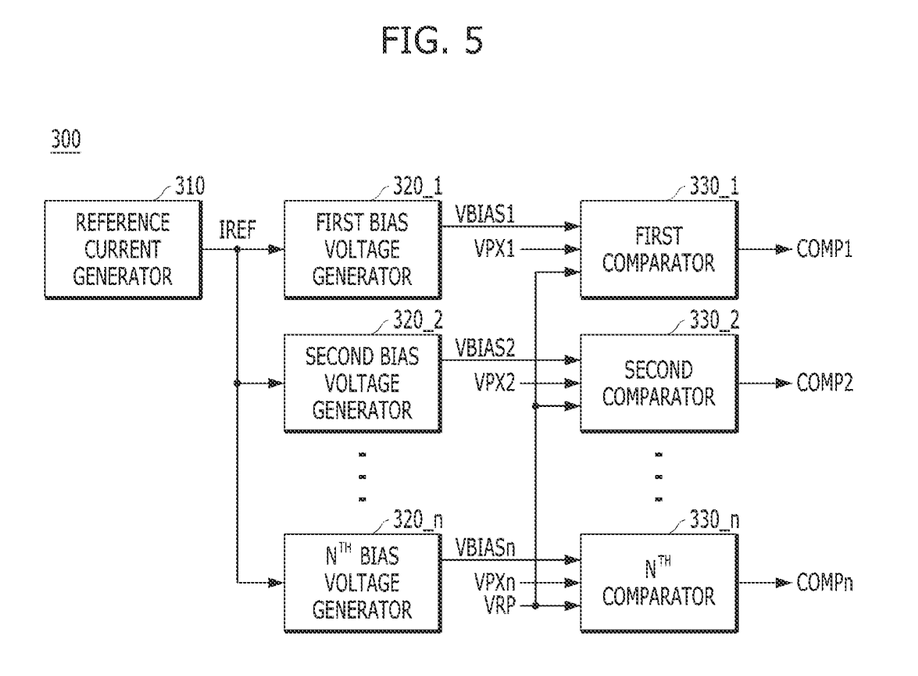
FIG. 5 is a block diagram illustrating an image sensing device in accordance with a third embodiment of the present disclosure.

FIG. 5 is a block diagram illustrating an image sensing device 300 in accordance with a third embodiment of the present disclosure.

Referring to FIG. 5, the image sensing device 300 may include a reference current generator 310, first to $n^{th}$ bias voltage generators 320_1 to 320_$n$ and first to $n^{th}$ comparators 330_1 to 330_$n$.

The reference current generator 310 may generate a reference current IREF. For example, the reference current generator 310 may include a band-gap reference circuit.

The first to $n^{th}$ bias voltage generators 320_1 to 320_$n$ may generate first to $n^{th}$ bias voltages VBIAS1 to VBIASn corresponding to the reference current IREF, respectively. For example, the first to $n^{th}$ bias voltages VBIAS1 to VBIASn may have the same voltage level. The first to $n^{th}$ bias voltage generators 320_1 to 320_$n$ may compensate for the first to $n^{th}$ bias voltages VBIAS1 to VBIASn, respectively, based on the reference current IREF. In an embodiment, each of the first to $n^{th}$ bias voltage generators 320_1 to 320_$n$ may be coupled between a supply terminal of a first high voltage VDD1 and a supply terminal of a low voltage VSS (refer to FIG. 6).

The first to $n^{th}$ comparators 330_1 to 330_$n$ may be enabled based on the first to $n^{th}$ bias voltages VBIAS1 to VBIASn, respectively. The first to $n^{th}$ comparators 330_1 to 330_n may compare first to n$^{th}$ pixel signals VPX1 to VPXn with a ramp signal VRP, respectively, and generate first to n$^{th}$ comparison signals COMP1 to COMPn corresponding to the comparison results, respectively. For example, the first comparator 330_1 may be enabled based on the first bias voltage VBIAS1, compare the first pixel signal VPX1 with the ramp signal VRP, and generate the first comparison signal COMP1 corresponding to the comparison result. Although not illustrated, each of the first to n$^{th}$ comparators 30_1 to 330_n may be coupled between a supply terminal of a second high voltage VDD2 and the supply terminal of the low voltage VSS (refer to FIG. 6). The first high voltage VDD1 and the second high voltage VDD2 may be different voltages or the same I0 voltage.

Figure 6:
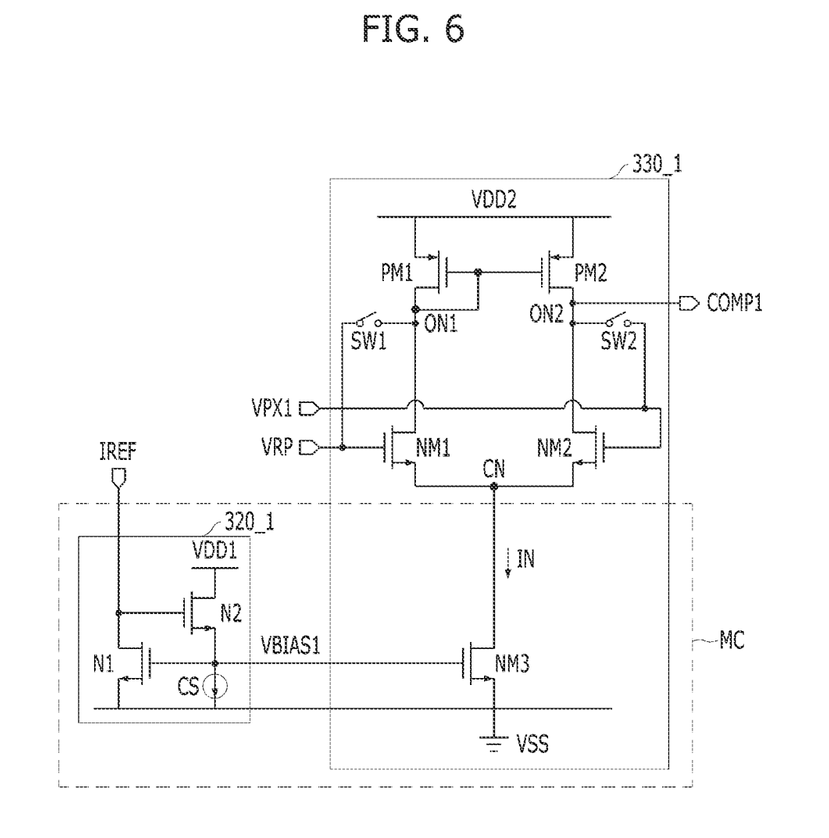
FIG. 6 is a circuit diagram illustrating a first bias voltage generator and a first comparator illustrated in FIG. 5.

FIG. 6 is a circuit diagram illustrating the first bias voltage generator 320_1 and the first comparator 330_1 illustrated in FIG. 5.

Referring to FIG. 6, the first bias voltage generator 320_1 may include a first mirroring element N1, a compensation element N2 and a current source CS.

The first mirroring element N1 may be coupled between an input terminal of the reference current IREF and the supply terminal of the low voltage VSS, and generate the first bias voltage VBIAS1 corresponding to the reference current IREF. For example, the first mirroring element N1 may include an NMOS transistor having a gate terminal coupled to an output terminal of the first bias voltage VBIAS1 and a drain terminal and a source terminal coupled between the input terminal of the reference current IREF and the supply terminal of the low voltage VSS.

The compensation element N2 may be coupled between the supply terminal of the first high voltage VDD1 and the output terminal of the first bias voltage VBIAS1, and compensate for the first bias voltage VBIAS1 based on the reference current IREF. For example, the compensation element N2 may include an NMOS transistor having a gate terminal coupled to the input terminal of the reference current IREF and a source terminal and a drain terminal coupled between the supply terminal of the first high voltage VDD1 and the output terminal of the first bias voltage VBIAS1.

The first mirroring element N1 and the compensation element N2 may be coupled to each other in a nested feedback structure.

The current source CS may be coupled between the output terminal of the first bias voltage VBIAS1 and the supply terminal of the low voltage VSS. The current source CS may serve to help the compensation element N2 to apply a compensation current to the output terminal of the first bias voltage VBIAS1.

The first comparator 330_1 may include current supply circuits PM1 and PM2, input circuits NM1 and NM2, an enable circuit NM3 and switch circuits SW1 and SW2.

The current supply circuits PM1 and PM2 may be coupled between the supply terminal of the second high voltage VDD2 and a pair of output terminals ON1 and ON2, The first comparison signal COMP1 may be generated through one of the pair of output terminals ON1 and ON2.

The input circuits NM1 and NM2 may be coupled between the pair of output terminals ON1 and ON2 and a common node CN. The input circuits NM1 and NM2 may receive the first pixel signal VPX1 and the ramp signal VRP.

The enable circuit NM3 may be coupled between the common node CN and the supply terminal of the low voltage VSS. The enable circuit NM3 may generate an operating current IN corresponding to the reference current IREF based on the first bias voltage VBIAS1. For example, the enable circuit NM3 may include an NMOS transistor having a gate terminal coupled to the output terminal of the first bias voltage VBIAS1 and a drain terminal and a source terminal coupled between the common node CN and the supply terminal of the low voltage VSS.

The enable circuit NM3 may be configured as a mirroring circuit MC together with the first bias voltage generator 320_1. That is, the enable circuit NM3 may be configured as a second mirroring element NM3 interconnected with the first mirroring element N1. The mirroring circuit MC may be coupled between the common node CN and the supply terminal of the low voltage VSS, and generate the operating current IN, which flows between the common node CN and the supply terminal of the low voltage VSS, by mirroring the reference current IREF. In an embodiment, the mirroring circuit MC may compensate for the operating current IN based on the reference current IREF.

Since each of the second to ntn bias voltage generators 320_2 to 320_n may be configured in the same manner as the first bias voltage generator 320_1, and each of the second to n$^{th}$ comparators 330_2 to 330_n may be configured in the same manner as the first comparator 330_1, detailed descriptions of the second to n$^{th}$ bias voltage generators 320_2 to 320_n and the second to n$^{th}$ comparators 330_2 to 330_n are omitted.

Although it is described as an example in the present embodiment that the n bias voltage generators 320_1 to 320_n and the n comparators 330_1 to 330_n are configured, the present disclosure is not limited thereto, and m bias voltage generators 320_1 to 320_m and the n comparators 330_1 to 330_n may be configured (where "m" is a natural number smaller than "n"), For example, when the m bias voltage generators 320_1 to 320_m and the n comparators 330_1 to 330_n are configured, the bias voltage generators and the comparators may be coupled to each other in a one-to-many relationship.

Hereinafter, an operation of the image sensing device 300 in accordance with the third embodiment, which has the above-described configuration, will be described.

When the reference current generator 310 generates the reference current IREF, the first to n$^{th}$ bias voltage generators 320_1 to 320_n may generate the first to n$^{th}$ bias voltages VBIAS1 to VBIASn, respectively, corresponding to the reference current IREF, and the first to n$^{th}$ comparators 330_1 to 330_n may be enabled according to the first to n$^{th}$ bias voltages VBIAS1 to VBIASn, respectively.

When the first to n$^{th}$ pixel signals VPX1 to VPXn and the ramp signal VRP are input, the first to n$^{th}$ comparators 330_1 to 330_n may compare the first to n$^{th}$ pixel signals VPX1 to VPXn with the ramp signal VRP, respectively, and generate the first to n$^{th}$ comparison signals COMP1 to COMPn corresponding to the comparison results, respectively.

In an embodiment, the first to n$^{th}$ comparators 330_1 to 330_n may operate simultaneously. That is, the first to n$^{th}$ comparison signals COMP1 to COMPn may transition simultaneously or transition at different timings according to levels of the first to n$^{th}$ pixel signals VPX1 to VPXn, respectively. As the number of comparison signals that transition simultaneously among the first to n$^{th}$ comparison signals COMP1 to COMPn is increased, noise may be reflected in the operating current IN flowing through each of the first to n$^{th}$ comparators 330_1 to 330_n. In other words, the noise having a positive (+) voltage level or a negative (−) voltage level may be applied to the output terminals of the first to n$^{th}$ bias voltages VBIAS1 to VBIASn. The noise is referred to as banding noise. The reference current IREF may not have a target level due to the banding noise. Since the first to $n^{th}$ bias voltages VBIAS1 to VBIASn also do not have the target level due to the reference current IREF not having the target level, the first to $n^{th}$ comparators 330_1 to 330_$n$ may not normally generate the first to rlth comparison signals COMP1 to COMPn.

However, the compensation element N2 included in each of the first to $n^{th}$ bias voltage generators 320_1 to 320_$n$ may sense when the reference current IREF does not have the target level, and compensate for the first to $n^{th}$ bias voltages VBIAS1 to VBIASn. For example, the compensation element N2 may adjust the compensation current applied to each of the output terminals of the first to $n^{th}$ bias voltages VBIAS1 to VBIASn when the reference current IREF is changed. When the reference current IREF becomes higher than the target level due to the banding noise having the positive (+) voltage level, the compensation element N2 may apply a relatively low compensation current to each of the output terminals of the first to $n^{th}$ bias voltages VBIAS1 to VBIASn. On the other hand, when the reference current IREF becomes lower than the target level due to the banding noise having the negative (−) voltage level, the compensation element N2 may apply a relatively high compensation current to each of the output terminals of the first to $n^{th}$ bias voltages VBIAS1 to VBIASn. Accordingly, the first to $n^{th}$ comparators 330_1 to 330_$n$ may normally generate the first to $n^{th}$ comparison signals COMP1 to COMPn, respectively, while the banding noise reflected in the operating current IN is offset.

Figure 7:
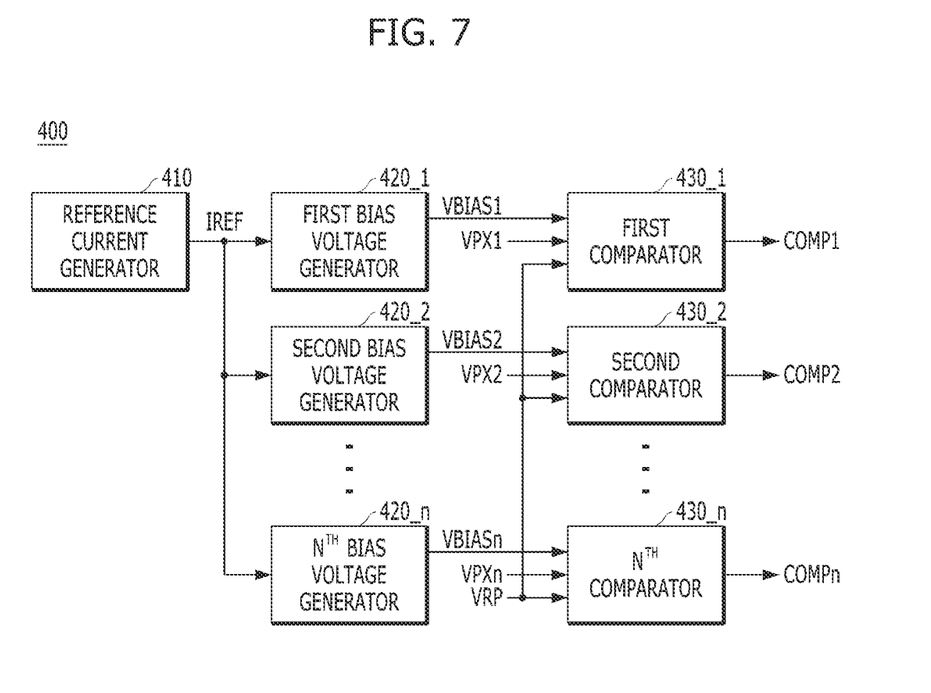
FIG. 7 is a block diagram illustrating an image sensing device in accordance with a fourth embodiment of the present disclosure.

FIG. 7 is a block diagram illustrating an image sensing device 400 in accordance with a fourth embodiment of the present disclosure.

Referring to FIG. 7, the image sensing device 400 may include a reference current generator 410, first to $n^{th}$ bias voltage generators 420_1 to 420_$n$ and first to $n^{th}$ comparators 430_1 to 430_$n$.

The reference current generator 410 may generate a reference current IREF. For example, the reference current generator 410 may include a band-gap reference circuit.

The first to $n^{th}$ bias voltage generators 420_1 to 420_$n$ may generate first to $n^{th}$ bias voltages VBIAS1 to VBIASn corresponding to the reference current IREF, respectively. For example, the first to $n^{th}$ bias voltages VBIAS1 to VBIASn may have the same voltage level.

The first to $n^{th}$ comparators 430_1 to 430_$n$ may be enabled based on the first to $n^{th}$ bias voltages VBIAS1 to VBIASn, respectively. The first to $n^{th}$ comparators 4301 to 430_$n$ may compare first to $n^{th}$ pixel signals VPX1 to VPXn with a ramp signal VRP, respectively, and generate first to $n^{th}$ comparison signals COMP1 to COMPn corresponding to the comparison results, respectively. For example, the first comparator 430_1 may be enabled based on the first bias voltage VBIAS1, compare the first pixel signal VPX1 with the ramp signal VRP, and generate the first comparison signal COMP1 corresponding to the comparison result. When comparing each of the first to $n^{th}$ pixel signals VPX1 to VPXn with the ramp signal VRP, the first to ntn comparators 430_1 to 430_$n$ may compensate for the first to $n^{th}$ bias voltages VBIAS1 to VBIASn, respectively, based on an operating current IN generated therein.

Figure 8:
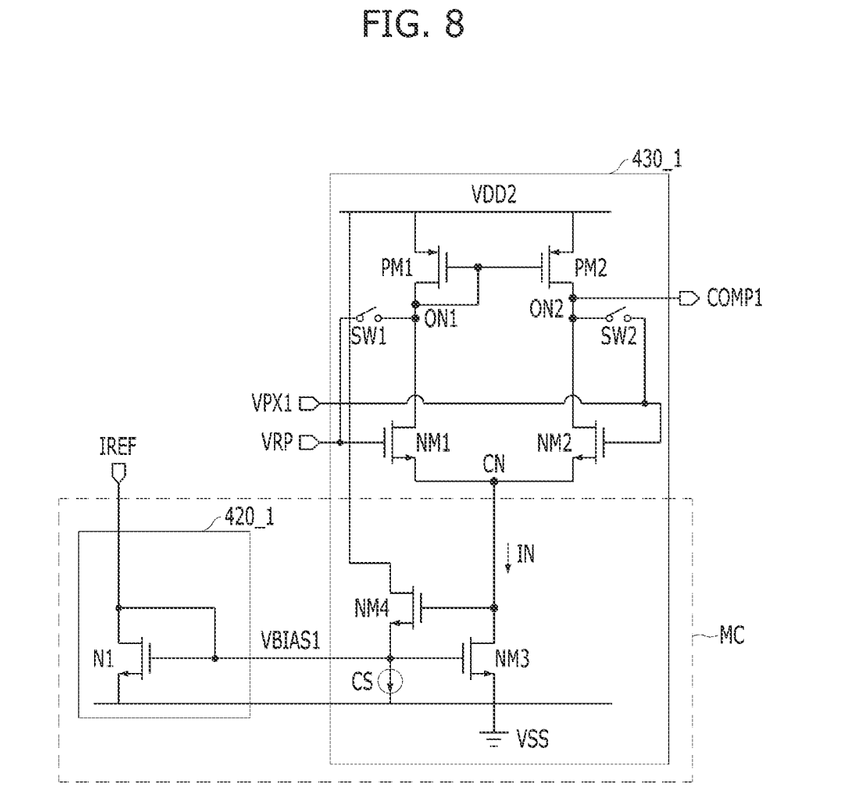
FIG. 8 is a circuit diagram illustrating a first bias voltage generator and a first comparator illustrated in FIG. 7.

FIG. 8 is a circuit diagram illustrating the first bias voltage generator 420_1 and the first comparator 430_1 illustrated in FIG. 7.

Referring to FIG. 8, the first bias voltage generator 420_1 may include a first mirroring element N1.

The first mirroring element N1 may be coupled between an input terminal of the reference current IREF and a supply terminal of the low voltage VSS, and generate the first bias voltage VBIAS1 corresponding to the reference current IREF. For example, the first mirroring element N1 may include an NMOS transistor having a gate terminal and a drain terminal coupled to an output terminal of the first bias voltage VBIAS1 and a source terminal coupled to the supply terminal of the low voltage VSS.

The first comparator 430_1 may include current supply circuits PM1 and PM2, input circuits NM1 and NM2, an enable circuit NM3, a compensation element 1014, a current source CS and switch circuits SW1 and SW2.

The current supply circuits PM1 and PM2 may be coupled between a supply terminal of a second high voltage VDD2 and a pair of output terminals ON1 and ON2. The first comparison signal COMP1 may be generated through one of the pair of output terminals ON1 and ON2.

The input circuits NM1 and NM2 may be coupled between the pair of output terminals ON1 and ON2 and a common node CN. The input circuits NM1 and NM2 may receive the first pixel signal VPX1 and the ramp signal VRP.

The enable circuit NM3 may be coupled between the common node CN and the supply terminal of the low voltage VSS. The enable circuit NM3 mnay generate the operating current IN corresponding to the reference current IREF based on the first bias voltage VBIAS1. For example, the enable circuit NM3 may include an NMOS transistor having a gate terminal coupled to the output terminal of the first bias voltage VBIAS1 and a drain terminal and a source terminal coupled between the common node CN and the supply terminal of the low voltage VSS.

The compensation element NM4 may be coupled between the supply terminal of the second high voltage VDD2 and the output terminal of the first bias voltage VBIAS1, and compensate for the first bias voltage VBIAS1 based on the operating current IN. For example, the compensation element NM4 may include an NMOS transistor having a gate terminal coupled to the common node CN and a source terminal and a drain terminal coupled between the supply terminal of the second high voltage VDD2 and the output terminal of the first bias voltage VBIAS1.

The enable circuit NM3 and the compensation element NM4 may be coupled to each other in a nested feedback structure.

The current source CS may be coupled between the output terminal of the first bias voltage VBIAS1 and the supply terminal of the low voltage VSS. The current source CS may serve to help the compensation element NM4 to apply a compensation current to the output terminal of the first bias voltage VBIAS1.

The enable circuit NM3 may be configured as a mirroring circuit MC together with the first bias voltage generator 420. That is, the enable circuit NM3 may be configured as a second mirroring element NM3 interconnected with the first mirroring element N1. The mirroring circuit MC may be coupled between the common node CN and the supply terminal of the low voltage VSS, and generate the operating current IN, which flows between the common node CN and the supply terminal of the low voltage VSS, by mirroring the reference current IREF. In an embodiment, the mirroring circuit MC may compensate for the operating current IN based on the operating current IN.

Since each of the second to $n^{th}$ bias voltage generators 420_2 to 420_$n$ may be configured in the same manner as the first bias voltage generator 420_1, and each of the second to $n^{th}$ comparators 4302 to 430_$n$ may be configured in the same manner as the first comparator 430_1, detailed descriptions of the second to $n^{th}$ bias voltage generators 420_2 to 420_n and the second to $n^{th}$ comparators 430_2 to 430_n are omitted.

Although it is described as an example in the present embodiment that the n bias voltage generators 420_1 to 420_n and the n comparators 430_1 to 430_n are configured, the present disclosure is not limited thereto, and m bias voltage generators 420_1 to 420_m and the n comparators 430_1 to 430_n may be configured (where "m" is a natural number less than "n"). For example, when the m bias voltage generators 420_1 to 420_m and the n comparators 430_1 to 430_n are configured, the bias voltage generators and the comparators may be coupled to each other in a one-to-many relationship.

Hereinafter, an operation of the image sensing device 400 in accordance with the fourth embodiment, which has the above-described configuration, will be described.

When the reference current generator 410 generates the reference current IREF, the first to $n^{th}$ bias voltage generators 420_1 to 420_n may generate the first to $n^{th}$ bias voltages VBIAS1 to VBIASn, respectively, corresponding to the reference current IREF, and the first to $n^{th}$ comparators 430_1 to 430_n may be enabled according to the first to $n^{th}$ bias voltages VBIAS1 to VBIASn, respectively.

When the first to $n^{th}$ pixel signals VPX1 to VPXn and the ramp signal VRP are input, the first to $n^{th}$ comparators 430_1 to 430_n may compare the first to $n^{th}$ pixel signals VPX1 to VPXn with the ramp signal VRP, respectively, and generate the first to $n^{th}$ comparison signals COMP1 to COMPn corresponding to the comparison results, respectively.

In an embodiment, the first to $n^{th}$ comparators 430_1 to 430_n may operate simultaneously. That is, the first to $n^{th}$ comparison signals COMP1 to COMPn may transition simultaneously or transition at different timings according to levels of the first to $n^{th}$ pixel signals VPX1 to VPXn, respectively. As the number of comparison signals that transition simultaneously among the first to $n^{th}$ comparison signals COMP1 to COMPn is increased, noise may be reflected in the operating current IN flowing through each of the first to $n^{th}$ comparators 430_1 to 430_n. In other words, the noise having a positive (+) voltage level or a negative (−) voltage level may be applied to the output terminals of the first to $n^{th}$ bias voltages VBIAS1 to VBIASn. The noise is referred to as banding noise. The reference current IREF may not have a target level due to the banding noise. Since the first to $n^{th}$ bias voltages VBIAS1 to VBIASn also do not have the target level due to the reference current IREF not having the target level, the first to $n^{th}$ comparators 430_1 to 430_n may not normally generate the first to $n^{th}$ comparison signals COMP1 to COMPn.

However, the compensation element NM4 included in each of the first to $n^{th}$ comparators 430_1 to 430_n may sense when the operating current IN does not have the target level, and compensate for the first to $n^{th}$ bias voltages VBIAS1 to VBIASn. For example, the compensation element NM4 may adjust the compensation current applied to each of the output terminals of the first to $n^{th}$ bias voltages VBIAS1 to VBIASn when the reference current IREF is changed. When the reference current IREF becomes higher than the target level due to the banding noise having the positive (+) voltage level, the compensation element NM4 may apply a relatively low compensation current to each of the output terminals of the first to $n^{th}$ bias voltages VBIAS1 to VBIASn. On the other hand, when the reference current IREF becomes lower than the target level due to the banding noise having the negative (−) voltage level, the compensation element NM4 may apply a relatively high compensation current to each of the output terminals of the first to $n^{th}$ bias voltages VBIAS1 to VBIASn. Accordingly, the first to $n^{th}$ comparators 430_1 to 430_n may normally generate the first to $n^{th}$ comparison signals COMP1 to COMPn, respectively, while the banding noise reflected in the operating current IN is offset.

In accordance with embodiments of the present disclosure, it is possible to suppress banding noise, reflected in an operating current, through a nested feedback structure.

In accordance with embodiments of the present disclosure, it is possible to prevent the degradation in image quality by suppressing handing noise occurring in a circuit structure.

While the present disclosure has been illustrated and described with respect to specific embodiment, the disclosed embodiment is provided for the description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. An image sensing device comprising:
    a current supply circuit coupled between a supply terminal of a first voltage and a pair of output terminals;
    an input circuit coupled between the pair of output terminals and a common node, and suitable for receiving a pixel signal and a ramp signal; and
    a mirroring circuit coupled between the common node and a supply terminal of a second voltage, and suitable for compensating for an operating current, which flows between the common node and the supply terminal of the second voltage, based on the operating current when generating the operating current by mirroring the reference current, wherein the mirroring circuit compensates for the operating current by adjusting a compensation current when the reference current is changed.

2. The image sensing device of claim 1, wherein the mirroring circuit includes:
    a first mirroring element coupled between an input terminal of the reference current and the supply terminal of the second voltage, and suitable for generating a bias voltage corresponding to the reference current;
    a second mirroring element coupled between the common node and the supply terminal of the second voltage, and suitable for generating the operating current corresponding to the reference current based on the bias voltage;
    a compensation element coupled between the supply terminal of the first voltage and an output terminal of the bias voltage, and suitable for compensating for the bias voltage based on the operating current; and
    a current source coupled between the output terminal of the bias voltage and the supply terminal of the second voltage.

3. The image sensing device of claim 2, wherein the first mirroring element and the compensation element are coupled to each other in a nested feedback structure.

4. An image sensing device comprising:
    a reference current generator suitable for generating a reference current;
    a bias voltage generator suitable for generating a bias voltage corresponding to the reference current; and
    a plurality of comparators enabled based on the bias voltage, and suitable for compensating for the bias voltage by sensing when an operating current does not have a target level based on the operating current generated therein when comparing a plurality of pixel signals with a ramp signal, respectively.

5. The image sensing device of claim 4, wherein each of the comparators includes:
a current supply circuit coupled between a supply terminal of a first voltage and a pair of output terminals;
an input circuit coupled between the pair of output terminals and a common node, and suitable for receiving each of the pixel signals and the ramp signal;
a second mirroring element coupled between the common node and a supply terminal of a second voltage, and suitable for generating the operating current corresponding to the reference current based on a corresponding bias voltage;
a compensation element coupled between the supply terminal of the first voltage and an output terminal of the corresponding bias voltage, and suitable for compensating for the bias voltage based on the operating current; and
a current source coupled between the output terminal of the corresponding bias voltage and the supply terminal of the second voltage.

6. The image sensing device of claim 5, wherein the second mirroring element and the compensation element are coupled to each other in a nested feedback structure.

7. The image sensing device of claim 4, wherein the bias voltage generator includes a first mirroring element coupled between an input terminal of the reference current and a supply terminal of a second voltage, and suitable for generating the bias voltage corresponding to the reference current.

8. An image sensing device comprising:
a generating circuit suitable for generating a bias voltage according to a reference current;
a comparing circuit suitable for generating an operating current according to the bias voltage and comparing, based on the operating current, a pixel signal with a ramp signal to generate a comparison signal; and
a compensating circuit suitable for compensating for the bias voltage by sensing when the operating current does not have a target level according to the operating current.

9. The image sensing device of claim 8, wherein the comparing circuit includes:
a current supply circuit coupled between a supply terminal of a first voltage and a pair of output terminals;
an input circuit coupled between the pair of output terminals and a common node, and suitable for receiving each of the pixel signals and the ramp signal;
a second mirroring element coupled between the common node and a supply terminal of a second voltage, and suitable for generating the operating current corresponding to the reference current based on the bias voltage; and
a current source coupled between the output terminal of the corresponding bias voltage and the supply terminal of the second voltage, and
wherein the compensating circuit coupled between the supply terminal of the first voltage and an output terminal of the corresponding bias voltage.

10. The image sensing device of claim 9, wherein the second mirroring element and the compensation element are coupled to each other in a nested feedback structure.

* * * * *